W. WYSSLING.
PRESSING OR MOLDING MACHINE.
APPLICATION FILED SEPT. 16, 1904.

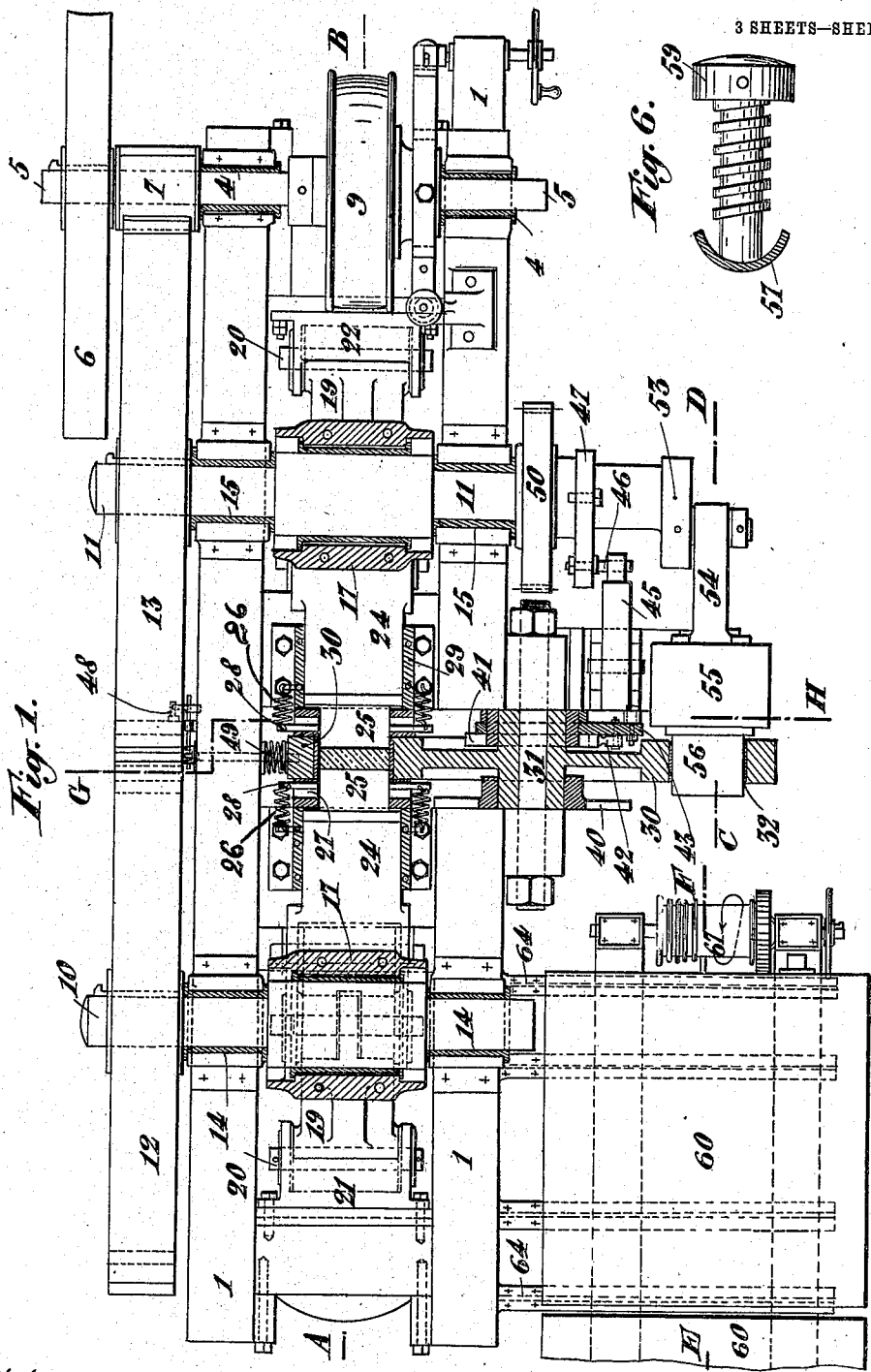

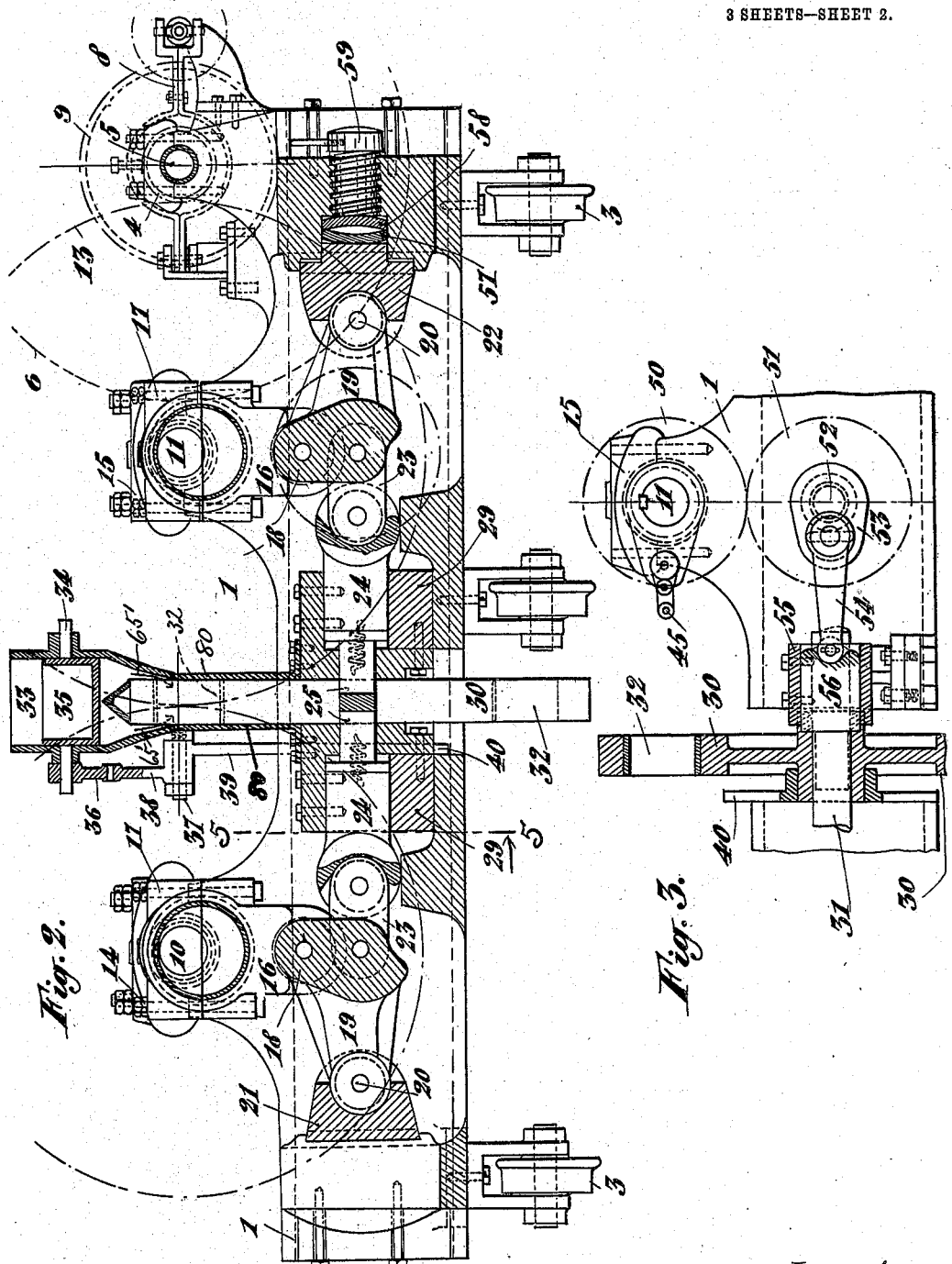

900,142.

Patented Oct. 6, 1908.

3 SHEETS—SHEET 3.

Witnesses:
J. B. Roman
E. N. Bond

Inventor
Wilhelm Wyssling
Wm. E. Boulter
Attorney.

UNITED STATES PATENT OFFICE.

WILHELM WYSSLING, OF PARIS, FRANCE.

PRESSING OR MOLDING MACHINE.

No. 900,142.     Specification of Letters Patent.     Patented Oct. 6, 1908.

Application filed September 16, 1904. Serial No. 224,670.

*To all whom it may concern:*

Be it known that I, WILHELM WYSSLING, a citizen of the Swiss Confederation, and resident of Paris, France, have invented certain new and useful Improvements in Pressing or Molding Machines for the Manufacture of Briquets, Bricks, or the Like, of which the following is a specification.

This invention has reference to an improved pressing or molding machine for the manufacture of briquets, bricks, or the like, the leading or distinguishing characteristics of which are that the plastic material is introduced in certain predetermined quantities, by means of mechanism which automatically delivers said material, into molds formed in or carried by an intermittently rotating vertical table, the plastic material being then subjected, while in said molds, to a pressure brought to bear on it simultaneously from both sides by pistons actuated by a system of knuckle-jointed levers, the molded briquets or bricks being thereafter pushed by special means on to a transport table.

Figure 4:
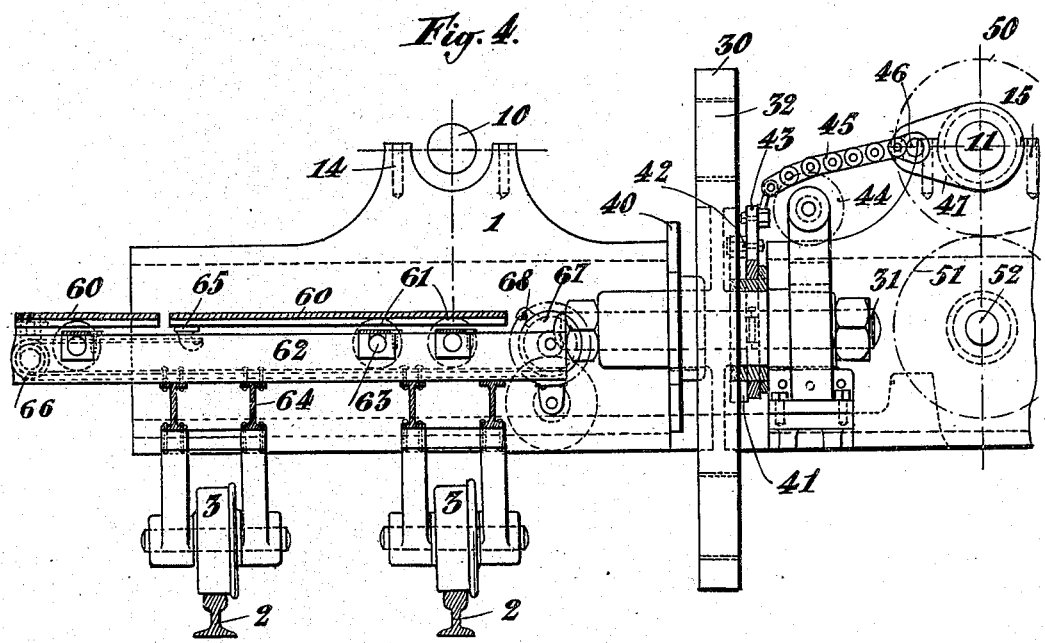
Figure 5:
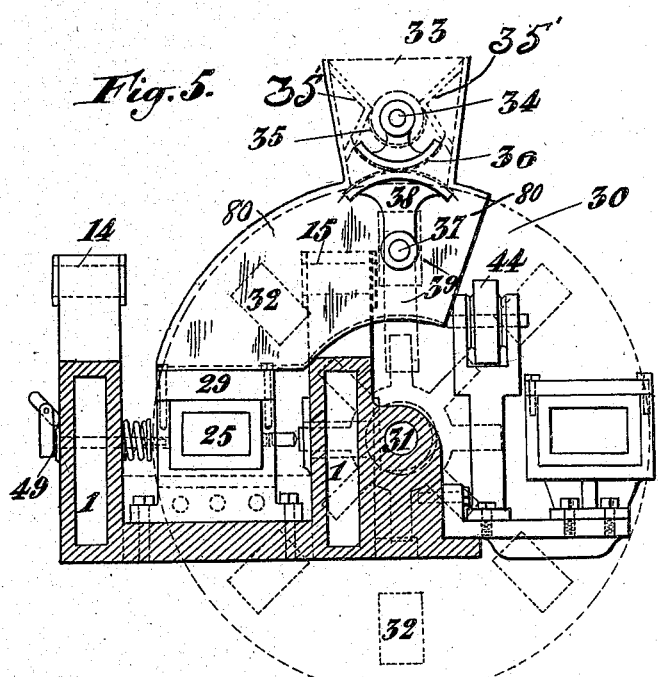

In the annexed drawings, which illustrate one form of my invention: Figure 1 is a plan view of the press, certain parts being shown in section, Fig. 2 is a sectional view on line A—B of Fig. 1, Fig. 3 is a sectional view on line C—D of Fig. 1, Fig. 4 is a sectional view on line E—F of the same figure, Fig. 5 is a vertical transverse section on line 5—5 of Fig. 2, looking in the direction of the arrow in said figure, and Fig. 6 shows on an enlarged scale a detached part.

The frame 1 of the machine may be fixed on a foundation of masonry or stonework, or, as illustrated in the example to be described, it is carried on wheels 3 adapted to travel on rails 2. At one end of the frame, bearings 4 carry a driving shaft 5 on which a fly wheel 6, a pinion 7, and a driving pulley 9 are mounted, said driving pulley being adapted to be thrown into or out of gear by a friction clutch 8. The pinion 7 operates two cylindrical toothed wheels 12, 13 carried on the shafts 10, 11 and in gear with each other, said shafts rotating in bearings 14, 15, with which the frame of the machine is provided.

On each of the shafts 10, 11 an eccentric 17, having an arm 16, is keyed, to which arm a cranked lever 18 is pivoted, the horizontal arm 19 of which is mounted on a spindle 20 carried by blocks or the like 21, 22—the former of which, shown at the left of Fig. 2, is fixedly and the latter elastically carried by the frame as hereinafter described.

To the elbow of the lever 18, a horizontal link 23 is connected, the opposite end of which actuates the compression piston 24 at the end of which is a matrix or block joined to it by springs 26, fixed to projecting pegs 28 which are slidable in slots 27. The pistons and blocks 25 slide in guides or bearings 29 between which there is a space wherein the vertical molding table or disk 30 is situated, said table being rotatably carried on a shaft 31, which latter is supported in bearings on the machine frame. Said table is formed with from 4 to 8 molds, 32, extending transversely through the wheel between the opposite parallel sides thereof and each of which molds is in turn filled with plastic material from a hopper 33 at the moment when the respective mold is vertically over the shaft on which the table rotates.

In order that the feeding or charging of the plastic material shall be effected with regularity, the hopper is provided with a cylindrical cup or the like 35 rotating on a spindle 34 on which a toothed segment 36 is keyed, which segment is in engagement with a second segment 38 oscillating on a spindle 37. The arm 39 of the toothed segment 38 engages a star wheel 40 mounted on the boss or nave of the table 30. The cup or receptacle 35 occupies a position with its open end uppermost so as to receive the plastic material during the time that the mold wheel or disk 30 is stationary. The material is directed into the cup by the inclined boards 35' arranged within the hopper, see Fig. 5. Now when the mold wheel turns to have another mold 32 filled, the arm 39 will be turned by the star wheel and the toothed segments will be turned thus causing the cup 35 to be turned sufficiently to discharge its contents into the mold 32 directly beneath. The parts are so timed that the mold wheel will be just about coming to rest when the cup 35 will begin its discharge. Upon the next partial rotation of the wheel the cup will through the media of the segments, arm 39 and star wheel be swung again into the position seen in Fig. 2. The rotation of this table is intermittent, that is to say, when it has completed a quarter or an eighth of a revolution it stops for a time, during which the compressing pistons operate.

In order that the plastic material will be prevented from falling out of each mold 32 during the time that a filled mold is traveling from the hopper to the point where the plastic material is to be compressed, two of the opposite sides of the hopper are extended to form plates 80 at opposite sides of the mold wheel and extending in an arc of a circle to the degree seen clearly in Fig. 5 of the drawings.

To obtain the rotation of the table, its boss is provided with a ratchet wheel 41 with which a pawl 42 engages, said pawl being carried by a lever 43 which rotates freely on the boss of the table. The free end of this lever 43 is connected to a chain 45 passing over a roller 44 and connected, at its other end, to a pin 46 on a crank 47, which is keyed on the shaft 11. The throw of the crank is such as to move the chain and oscillate the lever 43 sufficiently to rotate the mold wheel (through the media of the pawl 42 and ratchet wheel 41) a distance corresponding to the distance between the molds so that the mold wheel will always be rotated just enough to bring the next mold in proper position for filling or for receiving the compressing pistons. The stopping of the table, during the period when the compression takes place, is assured by an automatically operating stop pin 49 adapted to be disengaged by a lug or projection 48 on the toothed wheel 13, and adapted at the proper time to engage in an aperture formed in the periphery of the table. On the shaft 11, a second straight toothed wheel 50, is mounted which is in gear with another wheel, 51, underneath it and on the shaft 52 of which a crank 53 is mounted, which is connected to a link 54, which operates a piston 56 sliding in a guide 55 and serving to push the molded or pressed bricks or the like out of the molds 32 as these present themselves opposite it.

As hereinbefore stated, the block 22 is elastically mounted, that is to say, it bears against two concave spring plates or washers 57, 58, the concave sides of which are face to face. These spring washers may be moved or adjusted by means of a screw 59. Fig. 6 shows an alternative arrangement (only one spring 57 is here used) to form an elastic cushion to the pressure exerted during the molding or compressing.

For removing the finished bricks or the like, the press is provided with a traveling table consisting of a number of plates 60 which are supported on rollers 61. These latter turn on spindles 63 carried by supporting beams 62. Said beams are riveted on to girders 64 which are fixed on the machine frame. The first plate is provided, on its underside, with a hook 65 to which a cable 68 is attached, the latter passing over guide pulleys 66 and then to a winch 67. By rotating this winch to the left as viewed in Fig. 4, the plates are moved or advanced, and the bricks or the like thereon can thus be transported to the drying room, baking ovens or where else required.

The sides 80 are given such an inclination that the plastic material can pass from the hopper into the molds 32 as indicated by the arrows 65′ in Fig. 2.

Having now fully described my said invention, what I claim and desire to secure by Letters Patent is:—

1. In a machine of the character described the combination with a vertically arranged rotatable mold wheel having a plurality of mold cavities therein extending transversely through the wheel between the opposite parallel sides of the same, of means for discharging material into the said cavities as they successively reach a predetermined position comprising a hopper for the plastic material, having two of its sides constructed to conduct said material into the mold cavities successively, a rotatably mounted cup arranged within said hopper and adapted to be periodically turned to discharge its contents, and two oppositely arranged reciprocable members mounted independently of the mold wheel and adapted to enter each cavity from opposite sides and compress the material between their opposing faces and means for simultaneously reciprocating said members.

2. In a machine of the character described the combination with a vertically arranged rotatable mold wheel having a plurality of mold cavities therein extending transversely through the wheel between the opposite parallel sides of the same, of means for discharging material into said cavities as they successively reach a predetermined position, comprising a hopper for the plastic material, having two of its sides constructed to conduct said material into the mold cavities successively, a rotatably mounted cup arranged within said hopper and adapted to be periodically turned to discharge its contents, two oppositely arranged reciprocable pistons mounted independently of the mold wheel and blocks carried by said pistons adapted to enter each cavity from opposite sides and compress the material between them, and means for simultaneously reciprocating said pistons.

3. In a machine of the character described the combination with a vertically arranged rotatable mold wheel having a plurality of mold cavities therein extending transversely through the wheel between the opposite parallel sides of the same, of means for discharging material into said cavities as they successively reach a predetermined position, comprising a hopper for the plastic material, having two of its sides constructed to conduct said material into the mold cavities successively, a rotatably mounted cup arranged within said hopper and adapted to be periodically turned to discharge its contents, two oppositely arranged reciprocable pistons mounted independently of the mold wheel and blocks yieldingly connected with said pistons and adapted to enter the said cavities from opposite sides and compress the material between them, and means for reciprocating said pistons.

4. In a machine of the character described the combination with a vertically arranged rotatable mold wheel having a plurality of mold cavities therein, of means for discharging material into the said cavities as they successively reach a predetermined position, two oppositely arranged reciprocable members adapted to enter said cavities from opposite sides and compress the material between them, and means for simultaneously reciprocating said members comprising two rotatable shafts, an eccentric on each shaft, arms operated by said eccentrics, a cranked lever pivotally connected with each of said arms, blocks to which the arms of said cranked levers are connected and links pivotally connected at one end to the cranked levers and at the opposite end to the said reciprocable members, and a supporting frame supporting the said blocks.

5. In a machine of the character described the combination with a supporting frame, of a vertically arranged rotatable mold wheel having mold cavities therein, means for discharging material into said cavities as they successively reach a predetermined position, two oppositely arranged reciprocable members adapted to enter said cavities from opposite sides and compress the material between them, means for simultaneously reciprocating said members comprising two rotatable shafts, an eccentric on each shaft, arms operated by said eccentrics, a cranked lever pivotally connected with each of said arms, blocks to which the arms of said cranked levers are connected, one of said blocks being fixedly supported by the frame and the other block having a yielding connection with said frame, and links pivotally connected at one end to the cranked levers and at the opposite end to the said reciprocable members.

6. In a machine of the character described the combination with a vertically arranged rotatable mold wheel having mold cavities therein extending transversely through the wheel between the opposite parallel sides of the same, of means for discharging material into said cavities as they successively reach a predetermined point, two oppositely arranged reciprocable members mounted independently of the mold wheel and adapted to enter said cavities from opposite sides and compress the material between them, means for reciprocating said members simultaneously, a reciprocable piston adapted to enter the mold cavities as they successively reach a predetermined position and eject the blocks of material therefrom, and means for reciprocating the said piston, all as and for the purpose specified.

In testimony whereof I have hereunto set my hand in presence of two witnesses.

WILHELM WYSSLING.

Witnesses:
ADOLPH STURM,
HANSON C. COXE.